(12) United States Patent
Czysz (10) Patent No.: US 7,490,843 B2
(45) Date of Patent: Feb. 17, 2009

(54) FRONT END LATERAL SUSPENSION

(75) Inventor: Michael Czysz, Portland, OR (US)

(73) Assignee: MotoCzysz LLC, Portland, OR (US)

( * ) Notice: Subject to any disclaimer, the term of this patent is extended or adjusted under 35 U.S.C. 154(b) by 134 days.

(21) Appl. No.: 11/672,040

(22) Filed: Feb. 6, 2007

(65) Prior Publication Data
US 2007/0194553 A1 Aug. 23, 2007

Related U.S. Application Data

(60) Provisional application No. 60/765,805, filed on Feb. 6, 2006.

(51) Int. Cl.
*B62M 7/00* (2006.01)
(52) U.S. Cl. ............... 280/283; 280/275; 280/279; 280/283; 74/551.1; 74/551.4; 74/551.8
(58) Field of Classification Search .............. 280/276, 280/275, 279, 283; 74/551.1–551.8
See application file for complete search history.

(56) References Cited

U.S. PATENT DOCUMENTS

| | | | |
|---|---|---|---|
| 1,452,436 A | 4/1923 | Cyril | |
| 2,233,313 A | 2/1941 | Hazelroth | |
| 4,526,249 A | 7/1985 | Parker | |
| 4,660,683 A | 4/1987 | Hayashi et al. | |
| 5,069,467 A | 12/1991 | Claudio | |
| 5,449,155 A | 9/1995 | Mack | |
| 5,509,674 A | 4/1996 | Browning | |
| 5,509,676 A | 4/1996 | Fukutake et al. | |
| 5,749,590 A | 5/1998 | Roerig | |
| 5,855,388 A | 1/1999 | Brewer | |
| 5,924,714 A | 7/1999 | Farris et al. | |
| 6,017,047 A * | 1/2000 | Hoose | 280/276 |
| 6,145,637 A | 11/2000 | Hopey | |
| 6,241,391 B1 | 6/2001 | Hoose | |
| 6,260,870 B1 | 7/2001 | Fan | |
| 6,336,647 B1 | 1/2002 | Iwai et al. | |
| 6,357,775 B1 | 3/2002 | Iwai et al. | |
| 6,371,263 B1 | 4/2002 | Hoose | |
| 6,457,732 B2 | 10/2002 | Ito et al. | |
| 6,488,300 B2 | 12/2002 | Ito et al. | |

(Continued)

FOREIGN PATENT DOCUMENTS

EP 1671877 A1 6/2006

(Continued)

*Primary Examiner*—Paul N Dickson
*Assistant Examiner*—Tashiana Adams
(74) *Attorney, Agent, or Firm*—Chernoff, Vilhauer, McClung & Stenzel, LLP (57) ABSTRACT

A suspension assembly for a front end of a vehicle to provide lateral flex for absorption of lateral forces. The suspension assembly comprises a steering shaft including two ends: an end coupling to an upper triple clamp and the other end coupling to a lower triple clamp. A spring unit is coupled to one of the two ends of the steering shaft and absorbs forces that are transferred from a road surface up through a front wheel and the pair of forks retained by the upper and lower triple clamps. A pivot mechanism is coupled to the other one of the two ends of the steering shaft to create a pivoting axis. The suspension assembly permits the front end to pivot about the pivoting axis and the spring unit to flex in response to bumps in the road surface.

20 Claims, 11 Drawing Sheets

U.S. PATENT DOCUMENTS

| | | | |
|---|---|---|---|
| 6,517,095 B1 | 2/2003 | Lansac et al. | |
| 6,712,541 B1 | 3/2004 | Henricksen | |
| 6,899,193 B1 * | 5/2005 | Anibas | 180/227 |
| 7,018,126 B2 * | 3/2006 | Henricksen | 403/286 |
| 7,118,302 B1 * | 10/2006 | Durham | 403/344 |
| 7,178,820 B2 | 2/2007 | Terblanche | |
| 2006/0279059 A1 | 12/2006 | Czysz | |
| 2007/0144845 A1 * | 6/2007 | Saito | 188/281 |
| 2008/0129009 A1 | 6/2008 | Czysz | |

FOREIGN PATENT DOCUMENTS

| | | | |
|---|---|---|---|
| EP | 1671877 A1 * | 6/2006 | |
| EP | 1674386 A2 | 6/2006 | |
| EP | 1674386 A2 * | 6/2006 | |

* cited by examiner

FRONT END LATERAL SUSPENSION

CROSS-REFERENCE TO RELATED APPLICATIONS

This application claims priority over 35 U.S.C. § 119(e) to U.S. Provisional Application Ser. No. 60/765,805, filed Feb. 6, 2006, which is hereby expressly incorporated by reference.

TECHNICAL FIELD

The present invention relates generally to a front end suspension for vehicles, and more particularly, to a suspension for absorbing lateral forces on a motorcycle.

BACKGROUND

The extreme performance characteristics of modern day grand prix/racing motorcycles have led manufacturers to develop very stiff front end packages, designed to bear huge loads primarily during heavy braking. During this condition, the rearward force on the front tire's contact patch presses rearward on the lower portion of the forks at the axle and the inertia of the motorcycle's mass presses forward on the upper portion of the forks at the triple clamps. The resulting flex in the longitudinal direction (direction of travel of the motorcycle) is minimized by increasing the rigidity of the forks.

This increased stiffness of the front forks solves the problem of longitudinal flexing during braking. However, the compromise of a stiffer front end is the appearance of chatter, particularly during turns. Severe leaning angles typically result from motorcycles negotiating these turns and produce conditions conducive to chatter. When the motorcycle is leaning, the tire's contact patch shifts from the center to side, but the forces from the road are in the vertical direction. Upon hitting little bumps, the vertical force transfers onto the motorcycle mostly laterally. The inability of stiff forks to flex in the lateral direction causes the bumps and imperfections of the road surface to lift up the vehicle, as it is unable to absorb damping.

This problem leads to the vehicle losing contact with the road surface which can result in chatter. Being vibration that resonates from the front tire up to the chassis until dampened, chatter is a nuisance to riders and decreases motorcycle performance. Therefore, it is desirable to maintain longitudinal stiffness in the front end for rigidity under heavy breaking and at the same time, reduce chatter for improved handling of the motorcycle.

SUMMARY

The present invention provides an apparatus for reducing chatter on front ends of vehicles. This invention isolates two distinct stiffness of the front end: the longitudinal stiffness and the lateral stiffness. The desired rigidity of the longitudinal stiffness under heavy breaking is maintained, while the lateral stiffness is reduced to provide better dampening under severe leaning angles, and consequently improve handling.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
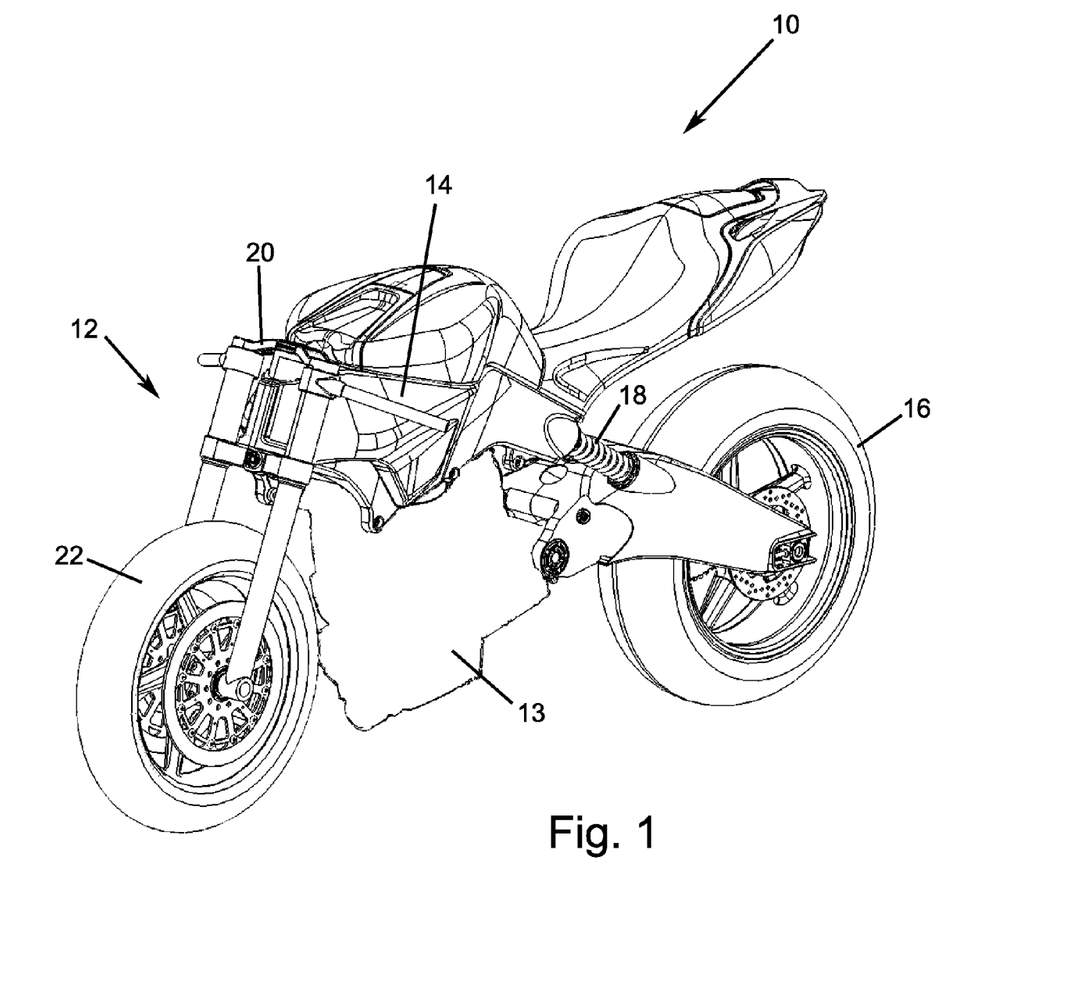
FIG. 1 is a perspective view of a motorcycle which includes a suspension assembly according to the present invention.

Referring to FIG. 1, a motorcycle according to one embodiment of the present invention is shown at 10. The motorcycle 10 includes a front end 12, an engine assembly 13, and a frame 14 supporting a rear wheel 16 via a rear suspension 18. The front end includes a suspension assembly 20 coupling a front wheel 22 to the frame and aiding in the absorption of lateral forces in certain conditions, as further described below.

Figure 2:
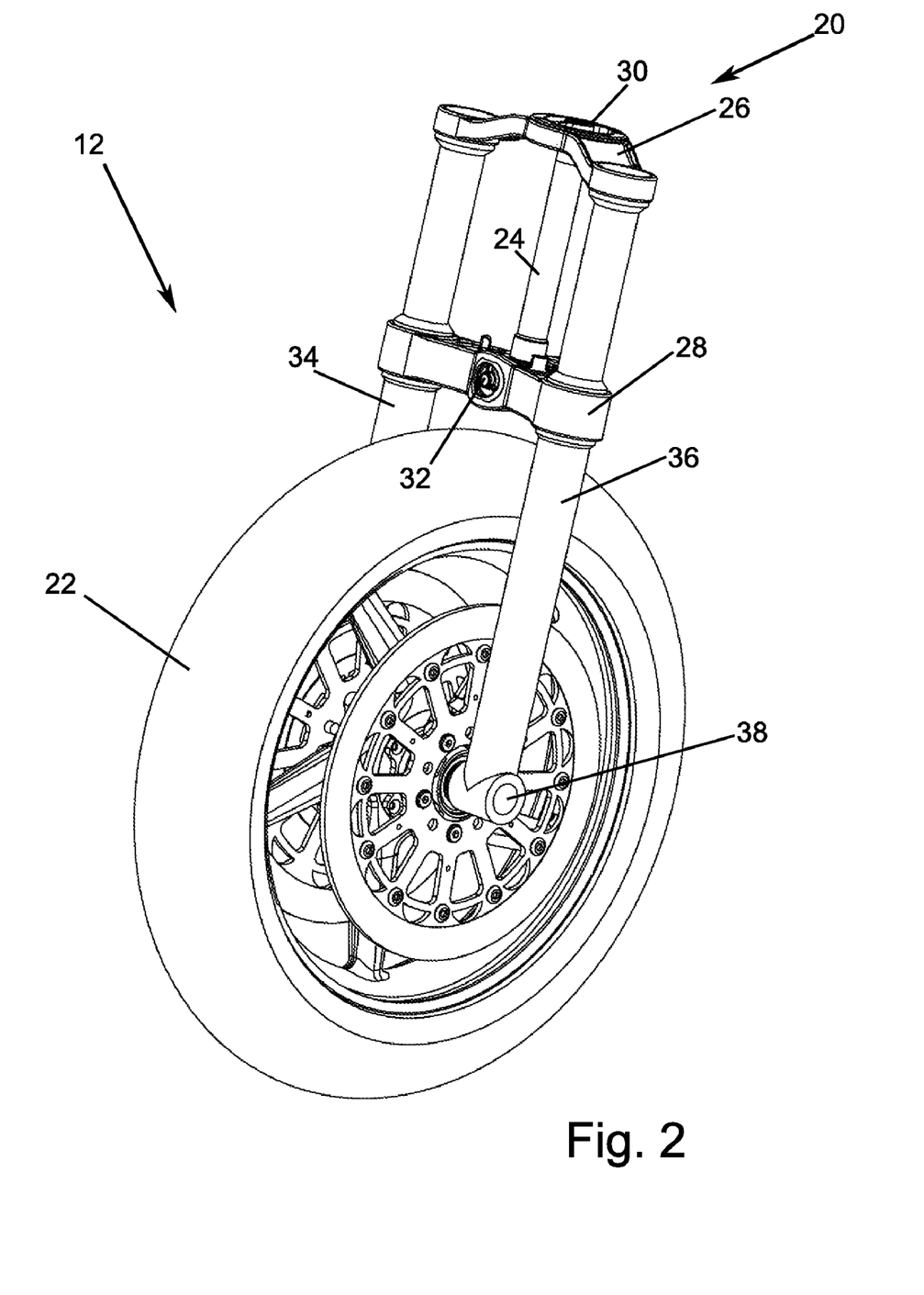
FIG. 2 is a perspective view of a front end of a motorcycle including a suspension assembly.

Turning to FIG. 2, the front end of the motorcycle is shown in more detail with several components removed. The front end 12 typically includes a steering tube which is part of, or coupled to, the frame of the motorcycle, to house a steering shaft 24. For illustrative purposes, the steering tube and parts of the frame have been removed to show additional detail.

The suspension assembly 20 includes the steering shaft 24, an upper triple clamp 26, a lower triple clamp 28, a spring unit 30 and a pivot mechanism 32. The upper triple clamp and the lower triple clamp are adapted to retain a pair of front forks 34, 36 coupled to the front wheel 22 via a front axle 38. Although the front forks are shown throughout this application as non-telescopic forks, the scope of the invention includes front forks having telescopic tubes, built-in rigidity or flex, dampeners within, and fork bottoms for coupling to the front axle. One or more of these features may be included in the front forks. Other features of conventional front forks may also be used with the front forks.

The suspension assembly 20 may separate flexional stiffness in the longitudinal direction (direction of travel of the motorcycle) from flexional stiffness in the lateral direction (side-to-side or perpendicular to the longitudinal direction).

Flexional stiffness in the longitudinal direction may be referred to as "longitudinal stiffness," whereas flexional stiffness in the lateral direction may be referred to as "lateral stiffness." By decoupling the longitudinal stiffness and the lateral stiffness in the front end, chatter may be reduced and handling characteristics may be improved. Detailed mechanics of the suspension assembly is described further below.

For simplicity, when the front end 12 is mentioned below, particularly in describing movement, the front end refers to the entire front end of the motorcycle 10 without the steering shaft 24 (which is stationary with respect to the frame). For further illustration and as non-limiting examples, FIGS. 3-6 are provided to exemplify the movement of the front end fitted with the suspension assembly 20. These depictions are exemplary only and may be exaggerated to show more detail.

Figure 3:
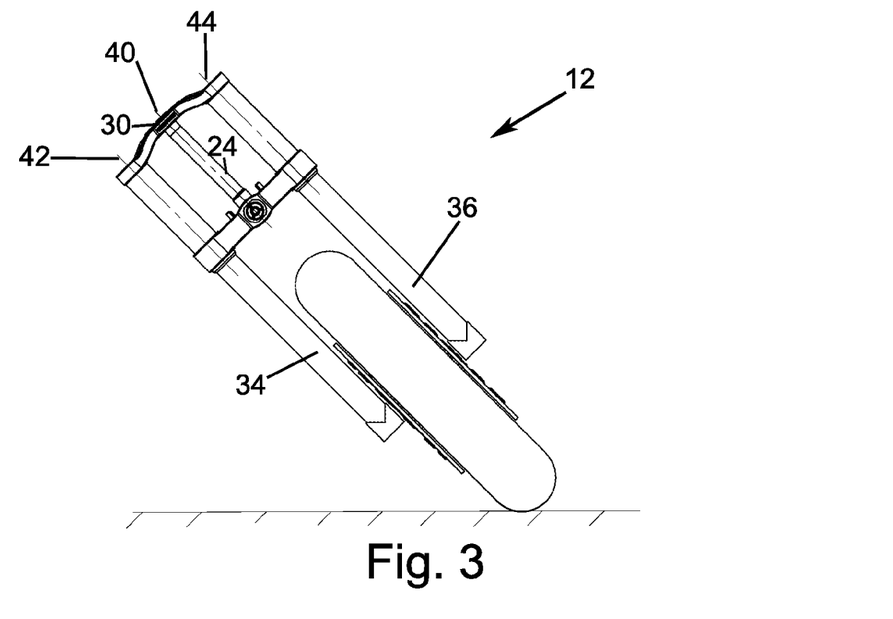
FIG. 3 is a front view of the front end of the motorcycle including a suspension assembly and leaning to the right side, such as when the motorcycle is negotiating a right corner.

Front views of the front end including the suspension assembly are shown in FIGS. 3-6. The front end of the motorcycle includes a steering axis 40, extending coaxially through the steering shaft 24, and two fork axes 42, 44, extending coaxially through each front fork 34, 36. The steering shaft is adapted to rotate about the steering axis 40 to steer the front end 12. In general, the steering axis and the two fork axes are substantially parallel during travel of the motorcycle. Referring to FIG. 3, the front end is turning right and leaning to the right side, such as when the motorcycle is rounding a right corner.

While the motorcycle is negotiating a corner, the motorcycle is typically leaning into the turn. The more the motorcycle leans, the greater (steeper) the lean angle. The lean angle at which the turn is made may vary depending on the turn radius, motorcycle speed, tire characteristics, rider handling, and the balance of centrifugal and gravitational forces. For example, the faster the speed and the smaller the turn radius, the greater the lean angle on the motorcycle. When the front end is at a steep lean angle, dampeners that are designed to absorb forces in the vertical direction are ineffective at absorbing forces which are effectively acting in the lateral direction. As a result, the front wheel loses contact with the ground and the inertia of the vehicle is slow to react. The suspension assembly may help solve this problem by decreasing the lateral stiffness (or allowing additional flexibility) of the front end for better absorption of lateral forces and improved cornering ability.

Figure 4:
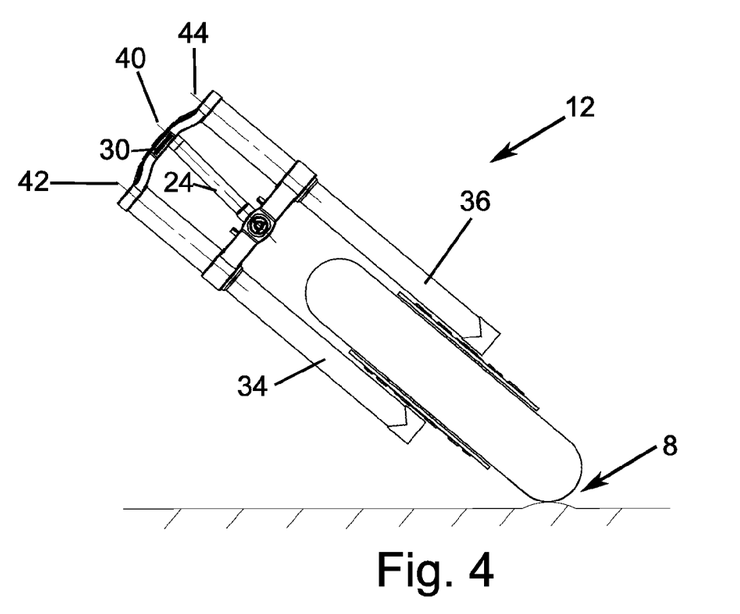
FIG. 4 is a front view of the front end of the motorcycle of FIG. 3 encountering a bump and leaning to the right side, such as when the motorcycle is negotiating a right corner.

FIG. 4 depicts the response of the front end 12 shortly after the motorcycle encounters a bump 8 in the road when rounding a corner. When referring to the bump, the terminology may include any imperfections in the road or debris that may contribute an additional force to the front end. This force is generally directed in the vertical direction, and impacts the front end. This vertical force (effectively lateral force on the leaning motorcycle) may be dampened using the suspension assembly.

The suspension assembly absorbs energy through deflection of a spring unit, further discussed below, and separates these forces acting on the front end from the frame to minimize the unsprung weight of the motorcycle. With less inertial weight, the front wheel of the motorcycle can return to the road surface in less time.

In response to the bump in FIG. 4, the front end may shift laterally or roll slightly to the side with respect to the frame of the motorcycle due to the flexibility allowed by the suspension assembly. As shown in this instance, the front forks move with respect to the steering shaft (which is stationary to the frame) and thus the steering axis and fork axes are no longer substantially parallel.

As the front end hits the bump in the road while traveling at an initial lean angle, the spring unit allows for displacement of the front end. For example, in reaction to the bump, the steering shaft remains substantially inclined to the initial lean angle whereas the rest of the front end has shifted to a different lean angle. During this instance, the front end may have a lean angle greater than the initial lean angle. FIGS. 3 and 4 may be contrasted to see the effect of the road imperfection on the front end and the suspension assembly.

Figure 5:
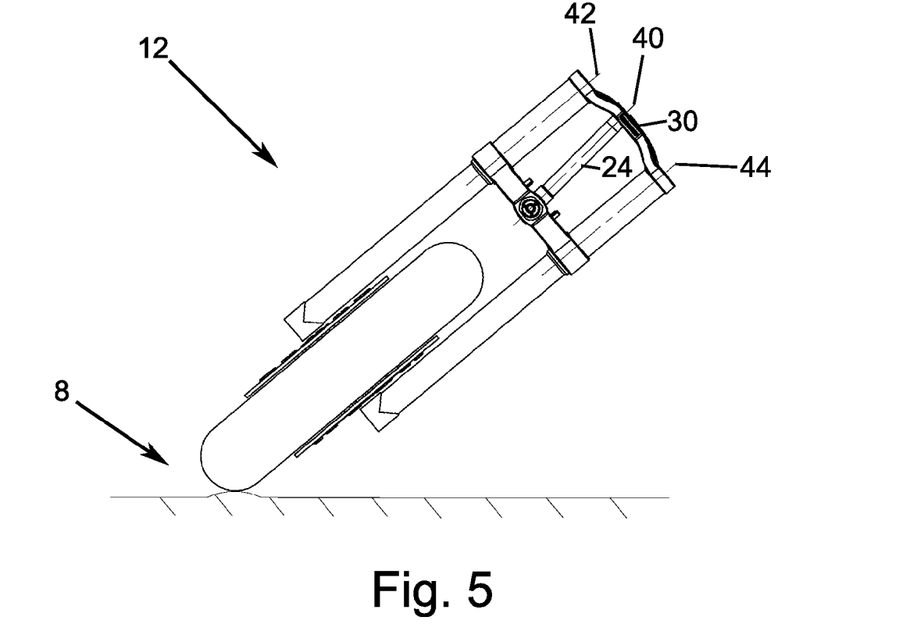
FIG. 5 is a front view of the front end of the motorcycle of FIG. 3 encountering a bump and leaning to the left side, such as when the motorcycle is negotiating a left corner.

Referring to FIG. 5, similar to FIG. 4, the motorcycle encounters a bump as it leans left into a left corner. The suspension assembly allows the front end to shift laterally to a larger lean angle from an initial lean angle and to the opposite side from that depicted in FIG. 4. As shown, the steering shaft remains inclined at the initial lean angle while the fork axes are still parallel to each other, but have shifted to a steeper lean angle. The spring unit 30 absorbs lateral forces, similarly as described above.

Figure 6:
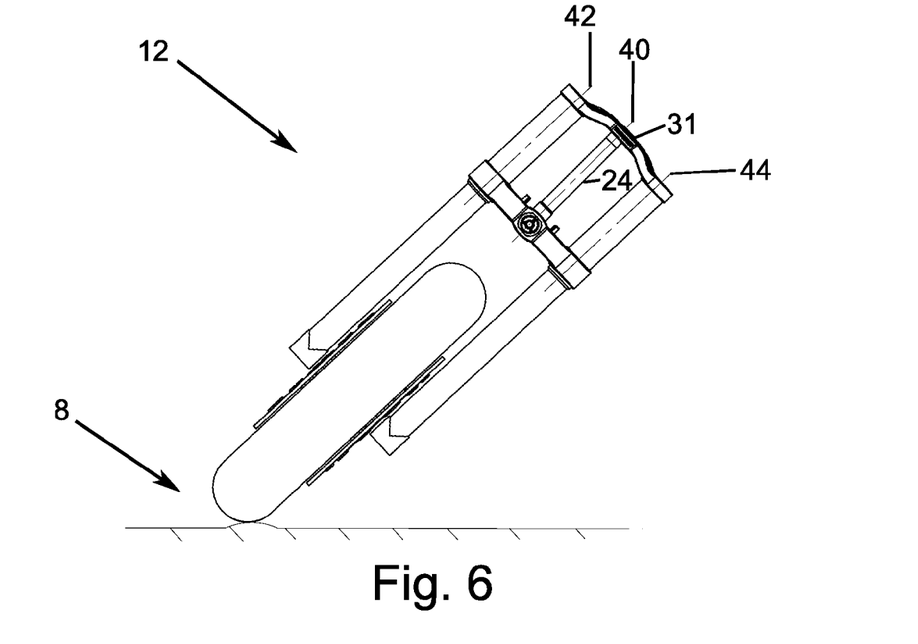
FIG. 6 is a front view of the front end of the motorcycle of FIG. 3 using a spring unit that is more rigid than the spring unit in the suspension assembly of FIGS. 3-5. The motorcycle is encountering a bump and leaning to the left side, such as when the motorcycle is negotiating a left corner.

In contrast to FIG. 5, FIG. 6 shows the front end fitted with a stiffer spring unit 31 in the suspension assembly. Depending on the rigidity of the spring unit, the lateral movement of the suspension assembly and front end may be very small or not visible when the spring unit is absorbing lateral forces.

Figure 7:
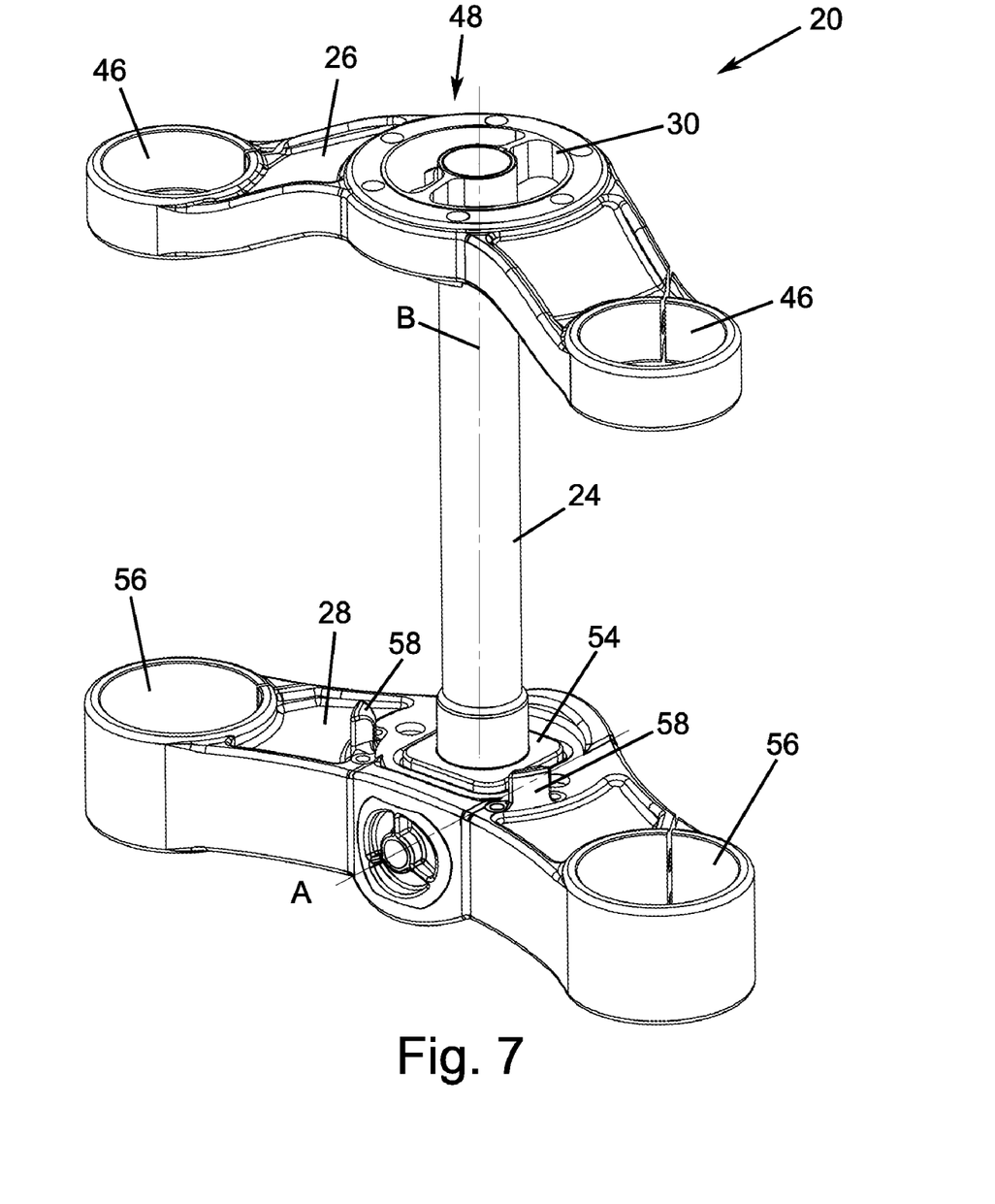
FIG. 7 is a perspective view of a suspension assembly, including a pivoting axis A and a steering axis B.

Referring to FIG. 7, one embodiment of the suspension assembly 20 is shown. The upper triple clamp 26 is a shaped plate including retention braces 46 on each side for retaining and securing the front forks 34, 36 (not shown). These retention braces may be adjusted to retain front forks with varying diameters. In the middle is an aperture 48 for housing the spring unit 30 and the steering shaft 24. The upper triple clamp further includes screw holes 40 that align with the spring unit and allow screws (not shown) to fasten to the spring unit by inserting through the bottom or top of the upper triple clamp. Attaching the spring unit to the upper triple clamp is not limited to using screws and screw holes, but may include using other fasteners and methods of coupling those components.

The steering shaft 24 is disposed substantially perpendicular to the upper triple clamp 26 and lower triple clamp 28. Optionally, the steering shaft may couple to the upper triple clamp and the lower triple clamp without the perpendicular relationship. The steering shaft includes an upper end 52 that is adapted to couple to the upper triple clamp and a lower end 54 that is adapted to couple to the lower triple clamp. The steering shaft is held securely to the frame via bearings (not shown). Although the steering shaft is shown to be cylindrical, the steering shaft may also be a rectangular prism or other suitable geometry.

The lower triple clamp 28 may be similar in shape to the upper triple clamp 26, and is oriented substantially parallel to the upper triple clamp. The lower triple clamp may be thicker (greater in height) than the upper triple clamp for the inclusion of bearing pockets and bearings (not shown)(not to be confused with bearings coupling the steering shaft to the frame). The bearing pockets are located on a front side and a back side of the lower triple clamp to house two bearings. The bearings permit the pivot shaft to rotate and support the load that acts on the suspension assembly.

The lower end 54 of the steering shaft 24 rests in the middle of the lower triple clamp 28 between the two retention braces 56. The lower end may be adapted to allow pivotal movement in the lateral direction about a pivot axis A, and/or the lower triple clamp provides a small clearance so that the lower triple clamp can pivot about axis A. This range of pivotal motion is limited by the flexibility or rigidity of the spring unit 30 located at the other end of the steering shaft. It may be little or no movement if the spring unit is very rigid or several degrees if the spring is less rigid or comprised of flexible material.

As mentioned above, when a typical motorcycle enters an orientation during travel where there is little or no dampening, such as when it is leaning over at a great angle, the motorcycle may chatter and decrease front wheel contact to the road surface. The suspension assembly may solve this problem by providing lateral flex to the motorcycle without compromising the rigidity necessary for hard braking. By decoupling the longitudinal and lateral forces, the suspension assembly allows the absorption of lateral forces and restores front wheel contact in less time.

Further, the front end may pivot about pivot axis A and at the same time, rotate about a steering axis B for steering of the motorcycle. In addition, steering stops 58 may be coupled to the lower triple clamp 28 to limit the range of motion in steering about axis B.

Figure 8:
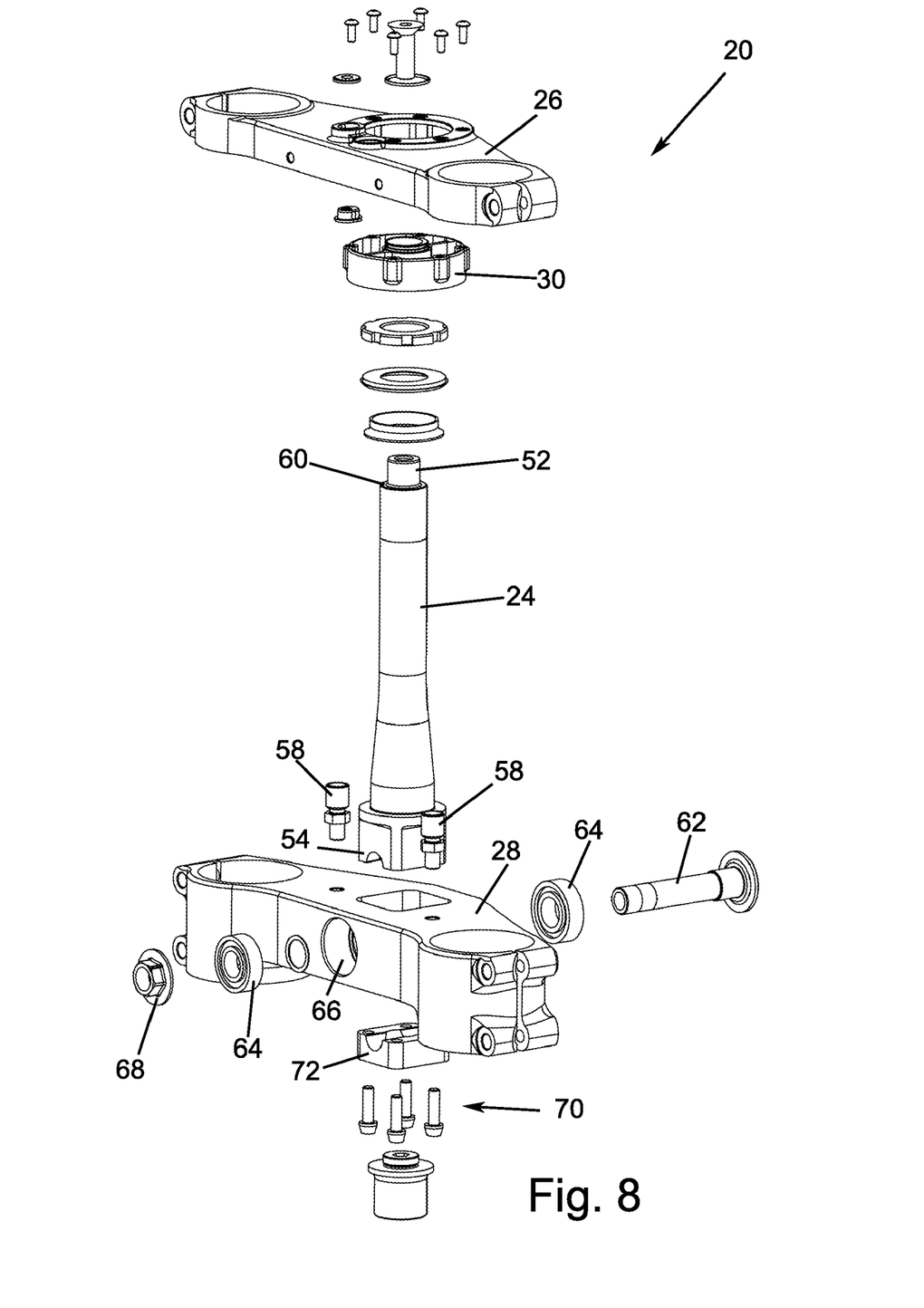
FIG. 8 is an exploded view of one embodiment of the suspension assembly.

Turning to FIG. 8, one embodiment of the suspension assembly 20 is shown in exploded view. As described above, the suspension assembly includes upper triple clamp 26, a lower triple clamp 28, and steering shaft 24 coupling the upper triple clamp to the lower triple clamp. The upper triple clamp and the lower triple clamp are substantially parallel to each other and the steering shaft is substantially perpendicular to the triple clamps. Alternatively, the steering shaft need not be substantially perpendicular to the triple clamps. The steering shaft is coupled to bearings which secure it to the frame of the motorcycle.

The suspension assembly 20 further includes a spring unit 30 coupling the upper triple clamp 26 and the steering shaft 24 together, and may serve to absorb forces that may be transferred from the upper triple clamp to the steering shaft and vice versa. The spring unit also inherently gives strength to the suspension assembly, in addition to the strength provided by the bearings, as further discussed below.

The upper end 52 of the steering shaft may include a shoulder 60 to assist in supporting the spring unit and other components for ease of coupling. Other components that may be located in this area include bearings (not shown) and lock nuts for connecting the steering shaft securely to the steering tube and frame.

The suspension assembly 20 further includes a pivot mechanism 62. As shown, the pivot mechanism may be a pivot shaft inserted through two bearings 64 located in bearing pockets 66 located in the lower triple clamp and secured by a pivot nut 68. The pivot shaft rotates with the bearings, which may bear much of the load that acts on the suspension assembly. The bearings help in maintaining longitudinal stiffness. Bolts 70 attach a steering shaft cap 72 to the lower end of the steering shaft, thus surrounding the pivot shaft and holding the pivot shaft so that the steering shaft can pivot with the pivot shaft.

Alternatively, the steering shaft may pivot on a different kind of pivot mechanism. For example, a ball and socket joint pivot mechanism may be used where the steering shaft may include a socket that swivels on a ball. The steering shaft or the lower triple clamp may include stops or geometry to allow only one plane of motion of the steering shaft as it swivels.

Figure 9:
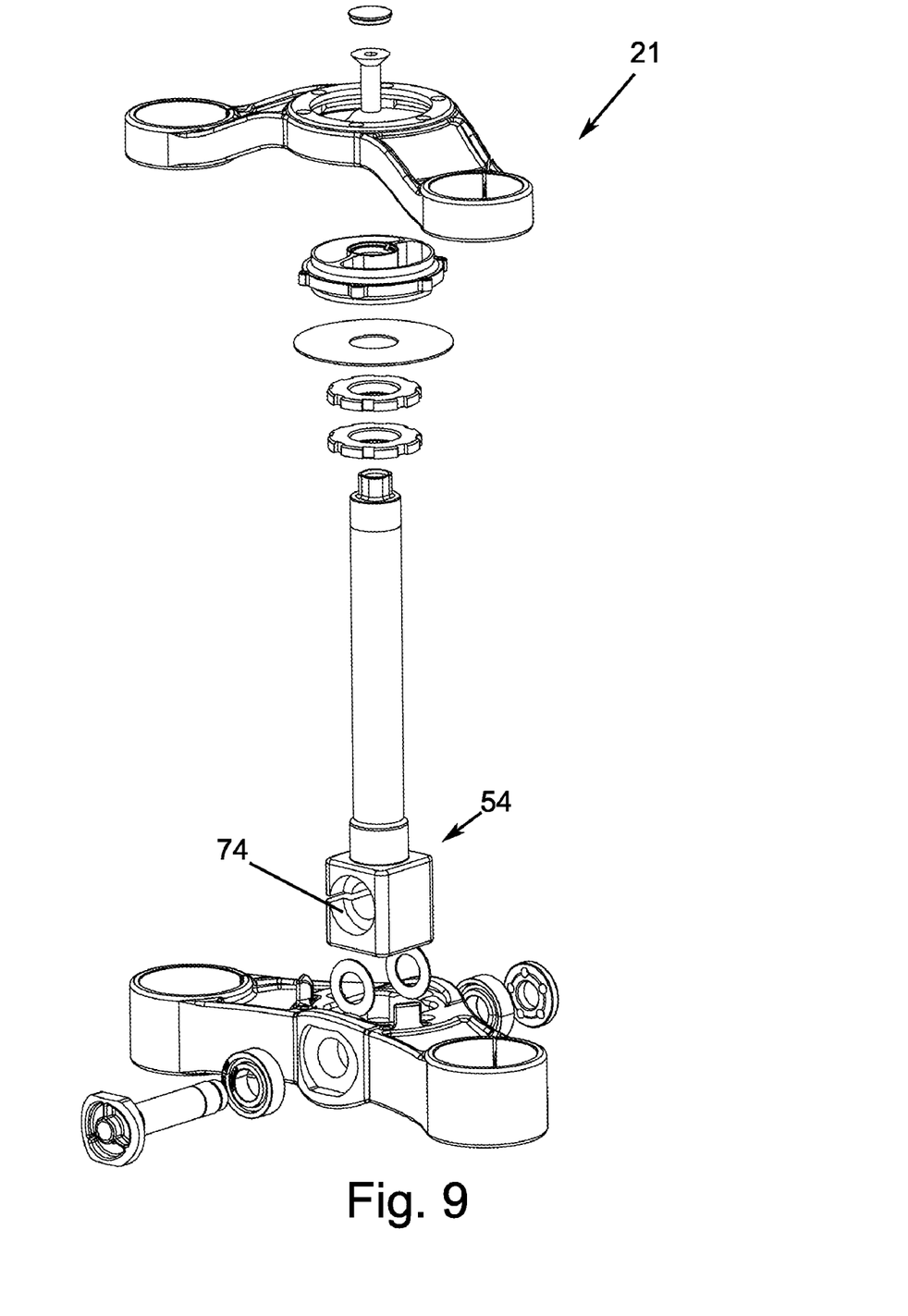
FIG. 9 is an exploded view of an alternate embodiment of the suspension assembly.

FIG. 9 is an alternate embodiment of the suspension assembly 21 as shown in exploded view. This embodiment of the suspension assembly is similar to the embodiment pictured in FIG. 8, and may include different designs of different components of the suspension assembly. The design variations do not change the general functionality of the suspension assembly, but instead offer an alternate way of constructing the suspension assembly. The design variations may include structural differences of the upper triple clamp, lower triple clamp, spring unit, and steering shaft. Some of these design variations are readily visible from the depiction of FIG. 9.

One of these design variations is the location of the bearing pockets for the coupling with the bearings and pivot mechanism. Instead of housing the bearings in the lower triple clamp, the bearings may be housed in the lower end 54 of the steering shaft at 74. The scope of the invention includes other adaptations of the steering shaft to allow for configurations that are conducive to effectuate absorption of lateral forces acting on the front end.

Further, the suspension assembly of FIGS. 8 and 9 may include the components illustrated in FIGS. 8 and 9 and although not mentioned, any washers, spacers, o-rings, seals, screws, nuts and bolts, fasteners and other components that may aid in the function of the suspension assembly. Optionally, dust seals may be included to prevent debris from entering the suspension assembly.

Figure 10:
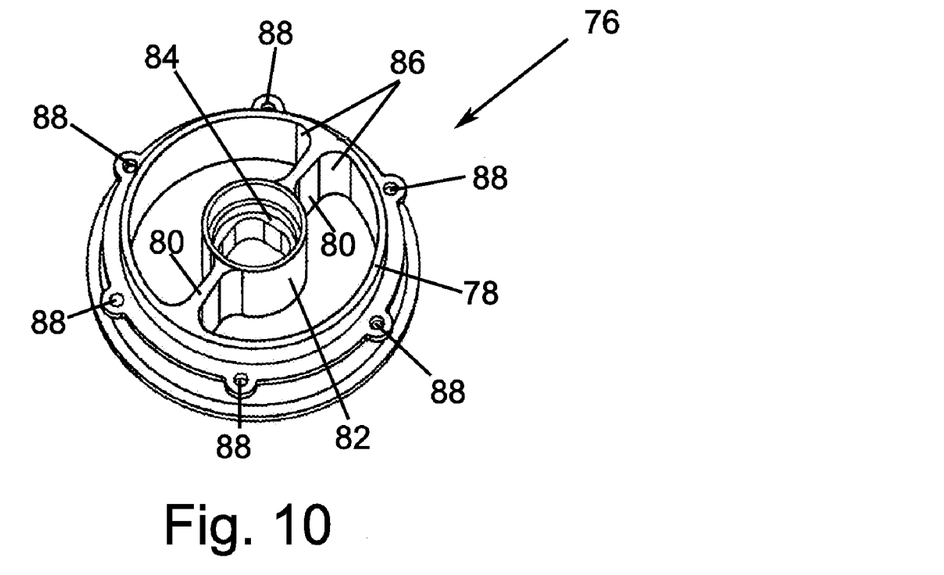
FIG. 10 is a perspective view of a spring unit for use in one embodiment of the suspension assembly.
Figure 11:
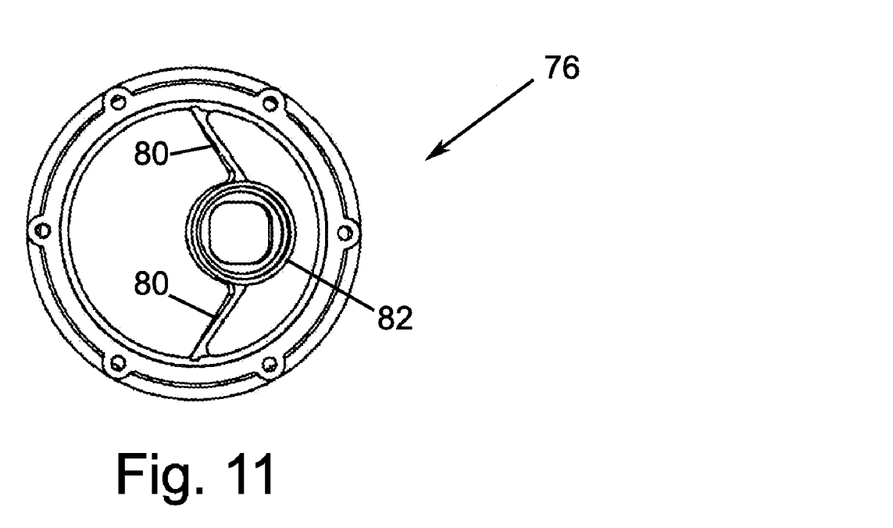
FIG. 11 is an exaggerated perspective view of the spring unit of FIG. 10 undergoing flex.

Referring to FIGS. 10-11, an exemplary spring unit for use in one embodiment of the suspension assembly is shown at 76. FIGS. 12-15 show exemplary spring units that may be used with alternate embodiments of the invention. Typically the spring units couple with the upper triple clamp. Alternatively, the spring units may couple with the lower triple clamp. As illustrated in a perspective view in FIG. 10, the spring unit 76 may be constructed with an annular frame 78 including two ribs 80 each connecting the annular frame with a center ring 82. The center ring includes an attaching surface 84 to bolt the upper triple clamp 26 (not shown) to the steering shaft 24 (not shown). In this figure, the attaching surface is shaped as a square with rounded corners.

As shown, where the ribs connect to the annular frame and to the center ring, the junctions 86 are filleted. The radius of the fillets may be varied to change the strength and rigidity of the spring unit.

It may be desirable to have extra strength in the longitudinal direction to withstand braking forces. By orienting the spring unit such that the ribs are aligned longitudinally, this can be achieved. For alignment, the spring unit may include a mechanism which allows for aligning the spring unit to a particular orientation. The mechanism may be placement of multiple holes, a square-shaped bolt hole, or other indicator for alignment. Multiple holes 88 may be adapted for fasteners to insert through and couple the spring unit to the upper triple clamp.

FIG. 11 shows an exaggerated top view of the spring unit of FIG. 10 undergoing flex as a spring. The ribs 80 and the center ring 82 may be displaced in the lateral direction (in this view, left and right) as well as in the vertical direction (in this view, into the page and out of the page). The ribs and the center ring may be displaced in a direction opposite than what is pictured as well. While the spring unit is flexing to absorb energy, the lateral forces distribute between the two ribs. When the forces have been absorbed, the spring unit returns to a neutral position such as shown in FIG. 10. The deflection in the spring unit is exaggerated for illustrative purposes.

Figure 12:
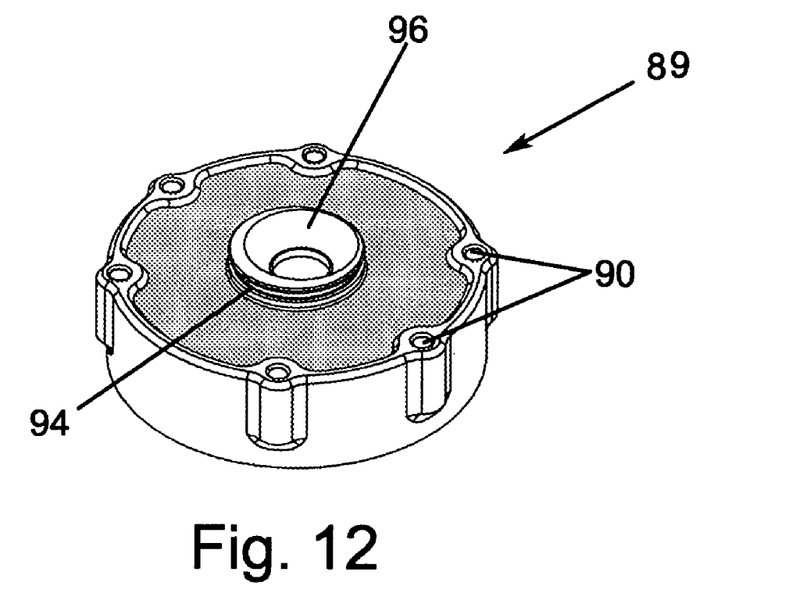
FIGS. 12-15 show perspective views of spring units for use in alternate embodiments of the suspension assembly.

Referring to FIG. 12, a spring unit suitable for use with another embodiment of the suspension assembly is shown at 89. The spring unit may be solid and constructed of a single material (shaded in the figure), thus the ribs as described above may be used, but are not required. As an alternative, if increased lateral stiffness is desired, the spring unit may be a rigid, solid block that does not exhibit characteristics of a spring. This offers the option of switching back to a conventional suspension system without having to dismantle and rebuild the front end in its entirety.

As illustrated in FIG. 12, the attachment means from the upper triple clamp to the spring unit may be different. For example, multiple holes for alignment or coupling to the upper triple clamp may be tapped for bolts to screw in from the top as shown as 90. In another example, the spring unit may include a raised concentric ring 92 with the outer circumference 94 threaded. In addition, the attaching surface as described in FIG. 10 is circular shaped in this embodiment of the spring unit. Further, the attaching surface may be tapered as shown at 96.

Figure 13:
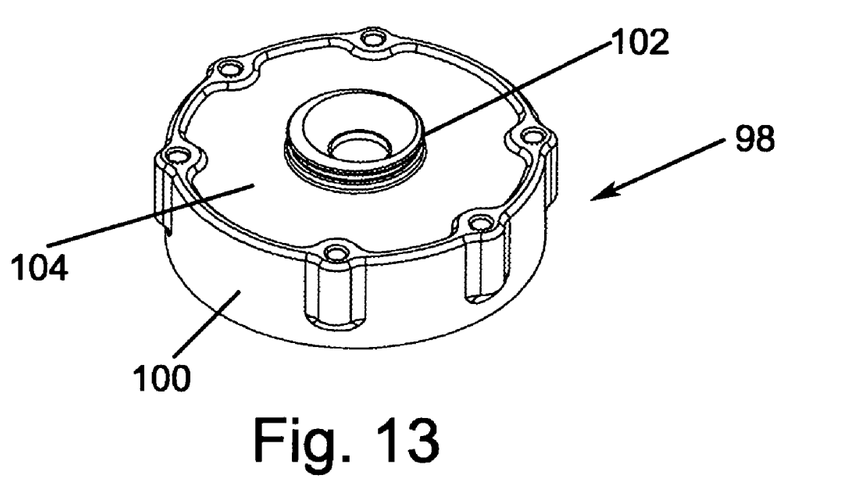

Referring now to FIG. 13, a spring unit 98 for use with an alternate embodiment may include an annular frame 100 with a center ring 102, similar to FIG. 12, with a vacant region 104 in between. Different materials for dampening may fill in the vacant region for improved absorption. These materials may include rubber neoprene, air or nitrogen bladders, honeycombed structures and the like, anisotropic materials, and other dampening materials. By changing the material, the dampening characteristics may be tuned to the desired amount and strengthened in the desired direction (generally longitudinally)

The vacant region may further include ribs that may flex, for example, such as shown in FIG. 11. In an alternate embodiment, the vacant region may include more ribs, different rib widths, lengths and thicknesses, radial and other rib arrangements, and varying fillet radii, in addition to dampening materials mentioned above.

Figure 14:
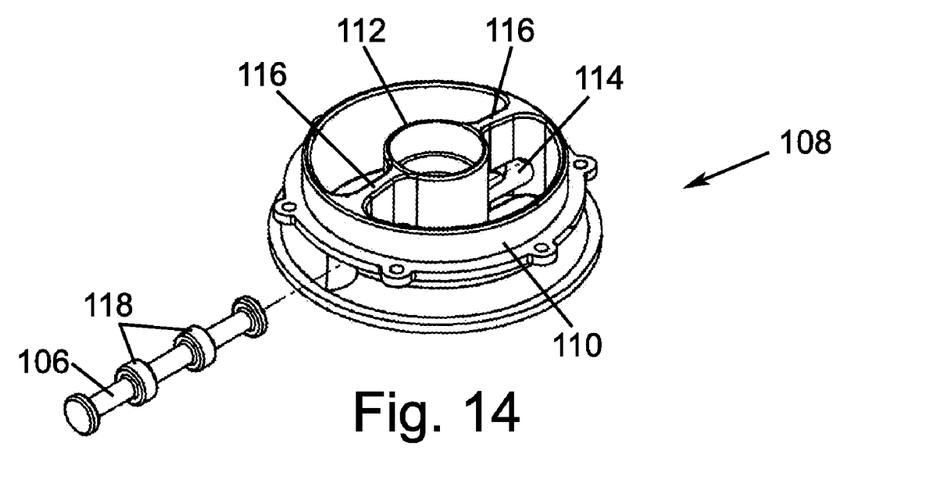

Turning to FIG. 14, in an alternate embodiment of the suspension assembly, a torsion rod 106 may be used to strengthen a spring unit 108 in the longitudinal direction. The spring unit may include an annular frame 110 with a center ring 112 and a passage 114 adapted for placement of the torsion rod. The passage is oriented parallel to the ribs 116, and cuts through the ribs and center ring. The torsion rod may include detents 118 spaced apart that assist in holding the torsion rod in place after the torsion rod is inserted in the spring unit. The torsion rod may be composed of titanium, steel, carbon fiber, aluminum or a more rigid material while the frame, ribs, and ring portions may be composed of aluminum or a different material.

Figure 15:
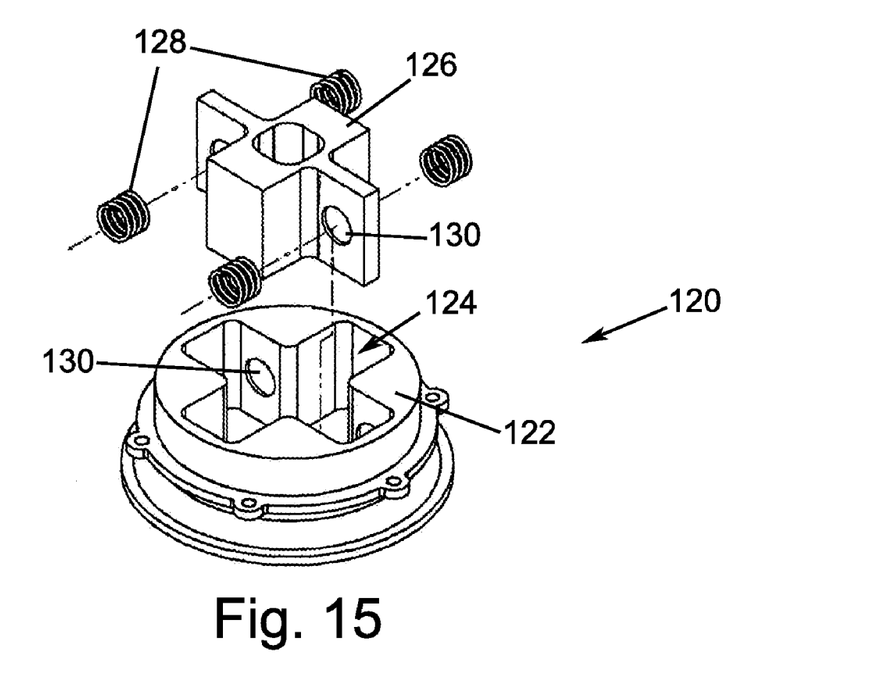

It should be noted that the spring unit does not necessitate an annular frame with center ring formation. The spring unit may have a different geometry, and still function similarly to the spring units as described. The center rings as shown in the spring units above may not need to be centered, concentric, or ring-shaped. For example, FIG. 15 shows a spring unit without an annular frame that may be used with an alternate embodiment of the suspension assembly. The spring unit includes a cylinder 122 with a hollow 124 in the shape of a cross. The spring unit further includes a spacer 126 shaped to fit inside the hollow and accommodate coil springs 128. The coil springs are positioned in the same orientation to enable the spacer to move in one general direction. The cylinder 122 and the spacer 126 may include shallow beds 130 which seat the coil springs and keep them in place during operation. In this configuration of the spring unit, the coil springs may be swapped with other springs to adjust to the desired flexibility of the spring unit. On certain inner surfaces of the spring unit where the spacer may contact directly, a coating such as a fluoropolymer or friction-reducing material may be applied.

The spring units as described may be alternatively constructed with different shapes or characteristics to enable the suspension assembly to function as desired. It is within the scope of the invention for a spring unit to use a polygonal or elliptical frame instead of an annular frame. Further, the suspension assembly allows for adjustable lateral stiffness by swapping a spring unit with certain characteristics for another one with different characteristics.

Additionally, these spring units may be partially or wholly manufactured out of aluminum, steel, titanium, carbon fiber or other suitable materials that may exhibit elastic properties and have sufficient tensile strength to withstand forces inflicted on the front end. Further, there may be other suitable materials, thicknesses, and variations of the geometry well within the scope of the invention to provide the desired longitudinal and lateral stiffness of the front end.

Figure 16:
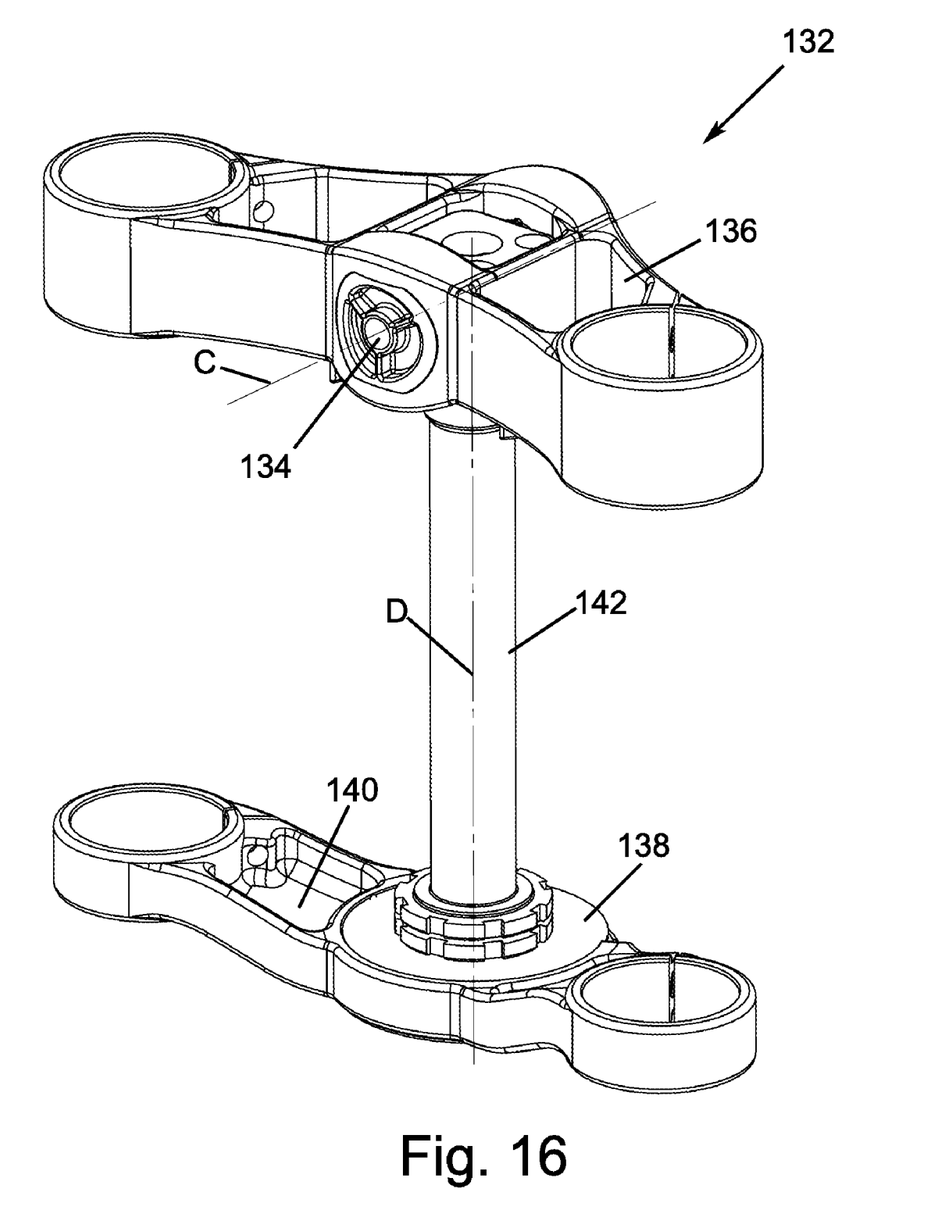
FIG. 16 is a perspective view of an alternate embodiment of the suspension assembly wherein the pivoting mechanism is located in the upper triple clamp and the spring unit is located in the lower triple clamp.

As shown in FIG. 16, an alternate embodiment of the suspension assembly 132 may include locating a pivot mechanism 134 in an upper triple clamp 136 while a spring unit 138 is located in the lower triple clamp 140. Both the pivot mechanism and the spring unit are coupled to a steering shaft 142. The principle of operation is the same in that when the motorcycle is leaning, the forces may transfer similarly and allow the suspension assembly to absorb lateral forces by pivoting about an axis C. Normal steering is unhindered as rotation of steering axis D is allowed.

All of the disclosed components of the invention may each embody different features as described that may provide advantages in manufacture and assembly. Some of the features may be mixed and matched on another embodiment of the invention and still be within the scope of the present invention.

While the invention has been described with reference to its use in a motorcycle, the invention is not limited to motorcycles, but can be used in bicycles, dirt bikes, and other vehicles. Further, the invention may be used with an "upside-down" fork, or it may alternatively be used with a traditional fork.

Some components have been illustrated as being of monolithic construction, while other components have been illustrated as being separate components coupled together. It is within the scope of the invention to combine these components or separate them due to design and manufacturing considerations. For example, the steering shaft may be constructed in multiple pieces for ease in manufacturing. The lower end of the steering shaft may be separately constructed as a block and coupled to a threaded end of the steering shaft, and still allowing functionality like the steering shaft as pictured. In another example, it is feasible for the spring unit to be integrally constructed or permanently attached to the upper triple clamp or the lower triple clamp. This may offer the benefit of obviating the need for alignment or additional assembly.

The skilled reader will further appreciate that the invention may be practiced in a "single-sided" front end, such as that found on some bicycles which have only a single fork. The term "triple clamp" should not necessarily be interpreted to mean that two forks are required with the steering shaft. For example, one of the two forks may be coaxial to the steering shaft or considered to be the steering shaft and the other fork and the front end may pivot about the lower end of the steering shaft. The presence of one or more springs or dampeners coaxial to or coupled to the steering shaft does not necessarily prohibit the additional presence of one or more springs or dampeners elsewhere, such as within the forks.

The various features illustrated in the figures may be combined in many ways, and should not be interpreted as though limited to the specific embodiments in which they were explained and shown. Those skilled in the art having the benefit of this disclosure will appreciate that many other variations from the foregoing description and drawings may be made within the scope of the present invention.

What is claimed is:

1. A suspension assembly for use with a front end of a vehicle, the suspension assembly comprising:
   an upper triple clamp;
   a lower triple clamp;

the upper and lower triple clamps adapted to retain a pair of forks, the pair of forks substantially parallel to each other;

a steering shaft substantially perpendicularly coupled to the upper and lower triple clamps; the steering shaft coupled to a frame of the vehicle and including two ends; wherein the upper triple clamp couples to one end of the steering shaft and the lower triple clamp couples to the other end of the steering shaft;

a spring unit coupled to one of the two ends of the steering shaft and adapted to absorb lateral forces that are transferred from a road surface up through a front wheel and the pair of forks; and a pivot mechanism coupled to the other one of the two ends of the steering shaft, the pivot mechanism including a pivoting axis substantially perpendicular to the steering shaft;

wherein at least one of the upper triple clamp and lower triple clamp is adapted to couple to the spring unit; and wherein the front end pivots about the pivoting axis and the spring unit flexes in response to bumps in the road surface.

2. The suspension assembly of claim 1 wherein at least one of the upper triple clamp and lower triple clamp houses bearings for coupling to the pivot mechanism.

3. The suspension assembly of claim 1 wherein the steering shaft is not parallel to the front forks at instances when the front end pivots about the pivoting axis.

4. The suspension assembly of claim 1 wherein the spring unit comprises ribs.

5. The suspension assembly of claim 1 wherein the spring unit comprises dampening material.

6. The suspension assembly of claim 1 wherein the spring unit is coupled to the upper triple clamp.

7. The suspension assembly of claim 1 wherein the spring unit is coupled to the lower triple clamp.

8. The suspension assembly of claim 1 wherein the spring unit is integral to one of the upper triple clamp and the lower triple clamp.

9. The suspension assembly of claim 1 further including bearings housed in one end of the steering shaft.

10. A motorcycle utilizing the suspension assembly of claim 1.

11. A suspension for a front end of a vehicle traveling in a longitudinal direction, the suspension comprising:

an upper triple clamp adapted to retain at least one front fork;

a lower triple clamp adapted to retain said front fork and coupled to the upper triple clamp via a steering shaft, the lower triple clamp being substantially parallel to the upper triple clamp;

a spring unit coupling the steering shaft to one of the upper triple clamp and the lower triple clamp, the spring unit adapted to absorb lateral forces acting on the front end; and a pivot mechanism coupling the steering shaft to one of the upper triple clamp and the lower triple clamp not coupled to the spring unit, the pivot mechanism permitting movement about a pivot axis not coaxial to the steering shaft;

wherein upon lateral forces acting on the front end, the lower triple clamp continues to be substantially parallel to the upper triple clamp, the spring unit undergoes flex, and the front end shifts with respect to the steering shaft to absorb lateral forces.

12. The suspension of claim 11 wherein the spring unit is swappable with another spring unit for adapting to different road conditions.

13. The suspension of claim 11 wherein the lower triple clamp houses bearings.

14. The suspension of claim 13 wherein the bearings couple to the pivot mechanism.

15. The suspension of claim 11 wherein the pivot axis is substantially perpendicular to the steering shaft.

16. A suspension assembly for a front end of a two-wheeled vehicle comprising:

an upper triple clamp retaining a pair of front forks;

a lower triple clamp retaining the pair of front forks;

wherein the front forks are substantially parallel to each other and couple to a front wheel;

a steering shaft coupled to the upper triple clamp and lower triple clamp and to a frame of the vehicle, the steering shaft being substantially parallel to the pair of front forks; and a spring unit coupling the steering shaft to one of the upper triple clamp and the lower triple clamp;

wherein when the vehicle is negotiating a turn, the steering shaft and the pair of front forks are substantially oriented at an initial lean angle and the spring unit flexes to permit the pair of front forks to orient to a different lean angle from the initial lean angle in response to the vehicle encountering a bump in the road surface.

17. The suspension assembly of claim 16 wherein the different lean angle is greater than the initial lean angle.

18. The suspension assembly of claim 16 further comprising a pivot mechanism coupled to one end of the steering shaft.

19. The suspension assembly of claim 18 wherein the pivot mechanism is coupled to bearings.

20. The suspension assembly of claim 16 wherein the front end includes a longitudinal direction of travel of the vehicle and a sideways lateral direction, perpendicular to the longitudinal direction, wherein the spring unit is adapted to provide flexibility in the lateral direction without reducing the rigidity in the longitudinal direction, wherein the spring unit absorbs energy by flexing.

* * * * *